UNITED STATES PATENT OFFICE.

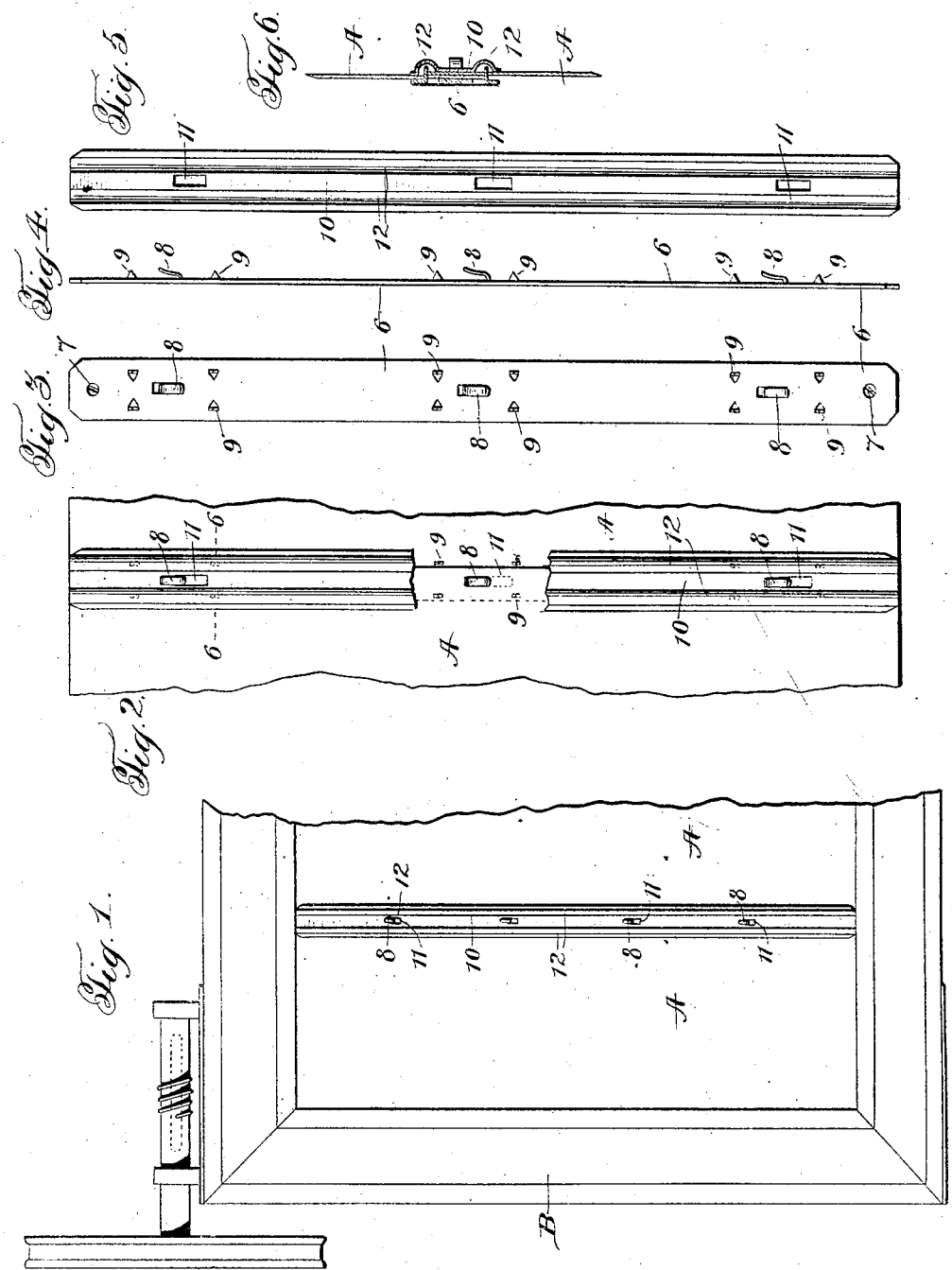

THEODORE KHARAS, OF OMAHA, NEBRASKA.

ADVERTISING DEVICE.

935,993.　　　　Specification of Letters Patent.　　Patented Oct. 5, 1909.

Application filed September 23, 1908. Serial No. 454,430.

*To all whom it may concern:*

Be it known that I, THEODORE KHARAS, a citizen of the United States, residing at Omaha, in the county of Douglas and State of Nebraska, have invented certain new and useful Improvements in Advertising Devices, of which the following is a specification, reference being had therein to the accompanying drawing.

This invention relates to the means whereby sheets, cards, and the like, for advertising or other display, are detachably held in place.

While the structure contemplated by the invention is susceptible of use generally for display elements, it is particularly adapted for employment in connection with advertising devices of the type disclosed in my United States Letters Patent No. 889,618, issued June 2, 1908.

It is an object of the invention to provide means whereby display elements may be reliably maintained in proper position and at the same time be capable of easy and quick attachment and removal.

When read in connection with the description herein, the details of construction and arrangement of parts contemplated by the invention will be apparent from the accompanying drawings, forming part hereof, wherein an embodiment of the invention is disclosed, for purposes of illustration.

Like reference-characters refer to corresponding parts in the several views of the drawings, whereof—

Figure 1 is a view of an advertising device having my invention attached thereto; Fig. 2 is a view of a display-element holding device, with parts broken away; Fig. 3 is a top view of the under member; Fig. 4 is a side view thereof; Fig. 5 is a bottom view of the top plate; and Fig. 6 is a cross sectional view of the holding device, taken on the line 6—6, Fig. 2.

Referring more particularly to the drawings, 6 designates the bottom plate or member of the attaching device, a number of which may be secured in series a suitable distance apart by screws or other suitable means 7 to any proper supporting structure, such as, for instance, to the belt A of an advertising device B of the traveling type shown in Fig. 1. Plate or member 6 is provided with a series of centrally-alined similarly-directed hooks 8, which may be formed in any economical and efficient manner, such as integrally by stamping out of the plate itself. Also formed on the plate, by stamping out or in some other suitable manner, are prongs or projections 9 extending from the same side as hooks 8. A series of prongs is disposed adjacent to each side edge of the plate, in lines not coincident with the line of hooks 8, preferably on each side of the hooks and in groups near each hook.

A top plate or member 10 is arranged to cover the bottom plate or member, and it is formed with a series of alined slots or openings 11 disposed to register with hooks 8. The hooks pass through the slots when the top plate is placed on the bottom plate, and, upon proper longitudinal movement of the top plate, the hooks will engage the upper surface of that plate and hold it clamped against the bottom plate.

In order that the top plate may not engage and bend down prongs or projections 9, to permit the prongs or projections to pass entirely through the display elements, and to permit the top plate to fit snugly against the bottom plate, the top plate, on the under surface, is formed with depressions or longitudinal grooves 12. These grooves register with and cover the prongs or projections, which prongs or projections extend into the depressions or grooves.

The attaching device is designed to hold sheets, cards, or the like, for advertising display or other purposes. The display elements, in the form of sheets, cards, or the like, are secured in series to successive devices by having their end edges clamped between the top and bottom plates or members and by being engaged by the prongs or projections. The end edges of two adjacent display elements may project between the plates only sufficiently to be engaged by the prongs on the respective sides of the bottom plate or member, or they may extend across the plate or member, lap, be engaged by the prongs on each side, and be pierced by the hooks, either of which methods of attachment is reliable. When it is desired to attach or detach the display elements, the top plate is moved longitudinally (upward in the position of the devices in the drawings) to release that plate from the hooks, whereupon the display elements may be placed in position on the bottom plate or member or removed therefrom. Then the top plate or member is returned to its position with respect to the bottom plate or member. The top plate or member, when clamping display elements against the bottom plate or member, presses the elements against the prongs or projections and causes them to be pierced thereby and prevents their pulling away from the securing device.

Having thus described my invention, what I claim as new, and desire to secure by Letters Patent, is—

1. A securing device comprising back and front members arranged to clamp a display element between them, projections on one of said members covered by the other member and arranged to engage the display element, and means whereby said back and front members are held in clamped position.

2. A securing device comprising back and front members arranged to clamp a display element between them, projections on one of said members arranged to engage the display element, the other member being formed with a depression adapted to permit said projections to extend therein, and means whereby said back and front members are held in clamped position.

3. In an advertising device, the combination with the portion thereof arranged to carry display elements, of an attaching device for said display elements comprising a back member secured to said carrying portion, a front member arranged to clamp display elements against the back member, projections on one of said members covered by the other member and arranged to engage a display element, and means whereby said back and front members are held in clamped position.

4. In an advertising device, the combination with the portion thereof arranged to carry display elements, of attaching devices for said display elements comprising back members secured to said carrying portion in series, a front member for each back member arranged to clamp the adjacent edges of display sheets, projections on one of said members arranged to engage the display sheets, the other member being adapted to hold the sheets against the projections and having depressions therein covering the projections, and means whereby said back and front members are held in clamped position.

In testimony whereof I affix my signature in presence of two witnesses.

THEODORE KHARAS.

Witnesses:
JNO. A. MCKENZIE,
GEO. K. HOWELL.